United States Patent [19]

Abraham

[11] Patent Number: 4,789,282
[45] Date of Patent: Dec. 6, 1988

[54] EXPANSION ANCHOR STUD

[76] Inventor: Frederic C. Abraham, 21 W. Parkway, Pequannock, N.J. 07440

[21] Appl. No.: 832,991

[22] Filed: Feb. 26, 1986

[51] Int. Cl.$^4$ .......................................... F16B 13/04
[52] U.S. Cl. ...................................... 411/24; 411/26; 411/28; 411/55; 411/63
[58] Field of Search ....................... 411/24, 25, 27, 34, 411/35, 44, 45, 49, 50, 51, 55, 28, 58, 60, 63, 64, 65, 26

[56] References Cited

U.S. PATENT DOCUMENTS

| | | | |
|---|---|---|---|
| 719,426 | 2/1903 | Boone | 411/26 |
| 1,513,669 | 10/1924 | Nicewarner | 411/24 |
| 2,143,086 | 1/1939 | Pleister | 411/28 |
| 3,432,214 | 3/1969 | Cashman | 411/24 X |
| 4,478,542 | 10/1984 | Whelan | 411/26 |
| 4,537,541 | 8/1985 | Giannuzzi | 411/55 |

FOREIGN PATENT DOCUMENTS

| | | | |
|---|---|---|---|
| 0062280 | 10/1982 | European Pat. Off. | 411/27 |
| 2547634 | 4/1977 | Fed. Rep. of Germany | 411/55 |
| 2803711 | 8/1979 | Fed. Rep. of Germany | 411/24 |
| 3105038 | 9/1982 | Fed. Rep. of Germany | 411/24 |
| 121053 | 3/1948 | Sweden | 411/24 |
| 1315957 | 5/1973 | United Kingdom | 411/28 |
| 2016106 | 9/1979 | United Kingdom | 411/24 |

Primary Examiner—Robert L. Wolfe
Assistant Examiner—Suzanne L. Dino
Attorney, Agent, or Firm—Gerald E. Linden

[57] ABSTRACT

An expansion anchor stud comprises an expansion anchor (16) for gripping a hole (25) in a surface (24), an axially-aligned threaded stud (14) of substantially the same outside diameter as the anchor (16) and engaging the distal end of the anchor (16) for being disposed in a hole (26) in a panel (27) mounted to the surface (24) and having a hole (28) therethrough, and an axially-aligned bolt (12) extending through the hole (28) in the stud (14) and engaging the anchor (16) and limited in insertion by the distal end of the stud (14).

5 Claims, 1 Drawing Sheet

EXPANSION ANCHOR STUD

TECHNICAL FIELD OF THE INVENTION

The invention relates to expansion type fasteners, more particularly to an expansion anchor stud.

BACKGROUND OF THE INVENTION

Expansion type anchor bolts are known for many uses that require a bolt to be held strongly within a particular surface. A frequent use of anchor bolts is to secure a member, such as a wood panel, to a surface, such as cinderblock. Typical anchor bolts require a larger hole in the cinderblock than in the wood panel. This can be inconvenient for the installer since the cinderblock cannot be drilled with the panel in place. These problems are discussed in U.S. Pat. No. 4,478,542 (Whelan, Jr., 1984), entitled EXPANSION ANCHOR GRIP SLEEVE ASSEMBLY. Whelan discloses a grip sleeve surrounding the bolt in the panel hole so that the panel hole may be of the same diameter as the underlying cinderblock hole. The grip sleeve functions as a hole spacer and also restrains the anchor from rotating during installation so that it can expand to grip the hole in the cinderblock, at which point it is self restraining.

A need for expansion type anchor studs also exists, and is constrained by analogous hole size problems.

DISCLOSURE OF THE INVENTION

Therefore, it is an object of this invention to provide an expansion type anchor stud that is insertable through a mounted panel into an underlying surface.

According to the invention, an expansion anchor stud comprises an expansion anchor for gripping a hole in a surface, an axially-aligned threaded stud of substantially the same outside diameter as the anchor and engaging the distal end of the anchor for being disposed in a hole in a panel mounted to the surface and having a hole therethrough, and an axially-aligned bolt extending through the hole in the stud and engaging the anchor and limited in insertion by the distal end of the stud.

Other objects, features and advantages will become apparent in light of the following description thereof.

BEST MODE FOR CARRYING OUT THE INVENTION

Figure 1:
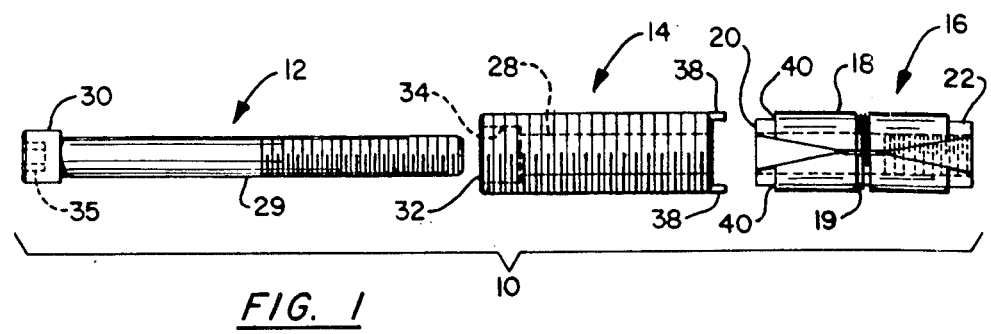
FIG. 1 is an exploded side view of the expansion anchor stud of this invention.

The expansion anchor stud 10 of this invention comprises the following major axially-aligned components:
a bolt 12;
a threaded stud 14; and
an expansion shield 16.
For descriptive consistency, the ends of the elements 12-16 towards the left side of the drawings are designated as the "distal" ends, and the ends of the elements 12-16 towards the right side of the drawings are designated as the "proximal" ends.

The expansion shield 16 is of the double expansion type, having an axially-split, generally cylindrical two-piece housing 18 held together by a circumferential clip 19, and having frusto-conical, wedge-like expansion members 20 and 22 disposed at either end and extending within the housing. The distal expansion member 20 has an axial hole therethrough for allowing the bolt 12 to pass therethrough. The proximal expansion member 22 has an axial hole therethrough which is threaded to receive the threads of the proximal end of the bolt.

When the bolt 12 is threaded into the proximal expansion member 22 and restrained from further axial motion while continuing to be threaded, the proximal expansion member 22 is drawn distally into the housing, causing the expansion thereof. As will be evident hereinafter, the distal expansion member 20 is similarly drawn into the housing 18 to cause expansion thereof. The expansion of the housing 18 causes the expansion shield 16 to grip a surface 24 in a hole 25 therein. The threaded stud 14 has an outside diameter substantially the same as the outside diameter of the housing 18. Thus, a hole 26 for receiving the expansion anchor stud 10 in a panel 27 may be substantially the same diameter as the hole 25 in the surface 24. The stud 14 has an axial hole 28 therethrough slightly larger than the diameter of the bolt shank 29 so that the bolt 12 may be inserted through the threaded stud 14 into the expansion shield. The head 30 of the bolt 12 is larger than the hole 28 in the threaded stud 14 so that the distal end of the stud 14 limits the axial motion of the bolt 12 when it is threaded into the expansion shield 16. Subsequent tightening of the bolt 12 causes the aforementioned expansion-causing motion of the proximal and distal expansion members 20 and 22 within the housing 18. The bolt 12 is, of course, longer than the threaded stud 14 so that its proximal end extends sufficiently past the proximal end of the stud 14 to engage the proximal expansion member 22. When the shield 16 is fully expanded, it is firmly seated within the surface 24.

It is preferable that the head 30 of the bolt 12 be flush with the distal end-surface 32 of the theaded stud 14, or even slightly recessed therein Therefore, a recess 34 corresponding to the depth and diameter of the bolt head 30, or even slightly deeper, is provided in the distal end-surface 32 of the stud 14. Such a recessed-type head arrangement requires a screwdriver slot or allen wrench recess 35 in the head 30 of the bolt 12 for tightening.

Figure 3:
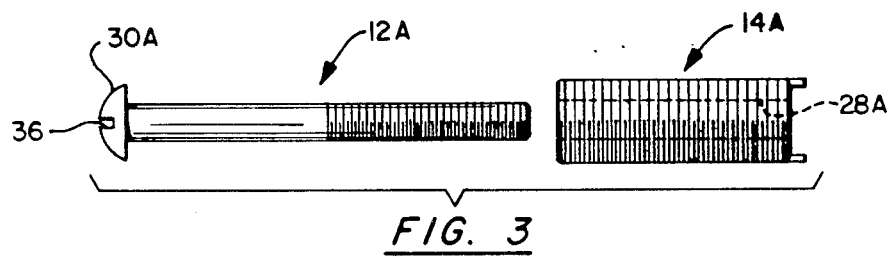
FIG. 3 is a side view of an alternate embodiment of a portion of the expansion anchor stud of FIG. 1.

In FIG. 3, it is shown that the hole 28A through the stud 14A may be of continous diameter (having no recess 34), in which case the head 30A of the bolt 12a has an outside diameter corresponding to the outside diameter of the stud 14A, and is provided with a screwdriver slot 36.

It is, of course, the ultimate object of this invention that the stud 14 be firmly seared relative to the surface 24. This is achieved primarily by rotationally interlocking the proximal end of the stud 14 and the distal end of the shield 16. This is conveniently achieved by providing axially-extending prongs 38 on the outside diameter of the proximal end of the stud and corresponding prong-receiving notches 40 on the outside diameter of the distal end of the shield 16. The notches 40 may be on the housing 18, or may be provided at "flats" on the distal expansion member 20.

Figure 4:
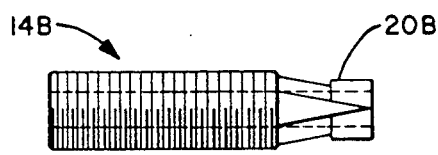
FIG. 4 is a side view of an alternate embodiment of a portion of the expansion anchor stud of FIG. 1.

As shown in FIG. 4, an alternative technique for rotationally interlocking the stud 14B and the shield is to form the stud 14B and the distal expansion member 20B as a unit, such as by cold forming them from one piece of stock.

Figure 2:
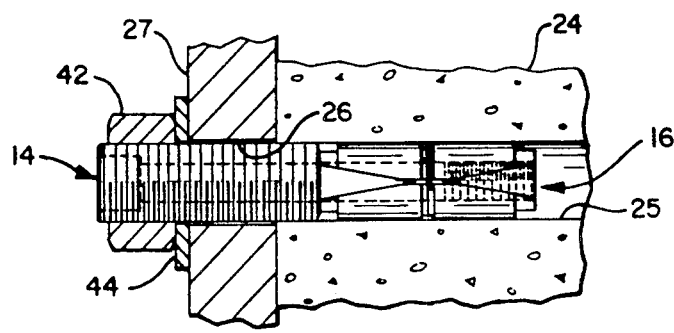
FIG. 2 is an assembled side view of the expansion anchor stud of FIG. 1.

It is evident that the bolt 12 bears the brunt of any shear stress placed on the expansion anchor stud 10. Being that the bolt 12 is of a smaller diameter than the threaded stud 14, it is important that the bolt posses a superior shear strength so that its total shear resistance (strength x area) is approximately equal to, or even greater than, the total shear resistance of the stud 14. The bolt must also posses superior tensile strength relative to the stud 14 so that their "pullout" (resistance to distal forces) characteristics are well matched Referring again to FIG. 2, it is preferable for enhanced support of the expansion anchor stud 10 that the threaded stud 14 be seated within the surface 24, in the hole 25. This is accomplished by assuring that the hole 25 is sufficiently deep to receive both the expansion shield 16 and a few threads of the proximal end of the stud 14.

A nut 42 and a washer 44 are threaded onto the distal end of the stud 14 to secure the panel 27 to the surface 24.

Typical, but not limiting, specifications for a ½ inch expansion anchor stud are:
- for the bolt 12, ¼ inch shank, 20 threads per inch, head diameter of 5/16 inch, and made from hardened alloy steel;
- for the stud 14, ½ inch diameter, 13 threads per inch, 17/64 inch hole diameter, and made from C1018 carbon steel; and
- for the shield 16, a Unifast (Long Island, N.Y.) "4015" ½ inch double expansion shield.

I claim:

1. An expansion anchor stud (10) for securing a member with a nut to a surface, said surface having a blind hole extending therein, comprising:
   a threaded bolt (12) of a first diameter;
   an externally threaded stud (14) of a second diameter adapted to receive an internally threaded nut, and having an axial hole therethrough for receiving the bolt (12), wherein the bolt (12) has a head (30) on its distal end that is larger than the axial hole in the threaded stud (14), and wherein the bolt (12) is longer than the threaded stud (14) so that the proximal end of the bolt (12) extends past the proximal end of the threaded stud (14); and
   an expansion shield (16) having an outside diameter substantially equal to the second diameter and threaded to receive the threads on the proximal end of the bolt (12);
   wherein threading the bolt (12) through the axial hole in the threaded stud and into the expansion shield (16) causes expansion of the expansion shield (16) and consequent setting of the expansion shield within a hole in a surface; and
   wherein a member is subsequently fastened to the surface when the nut is threaded onto the stud.

2. An expansion anchor stud according to claim 1, wherein the stud (14) has a recess in its distal end for receiving flush the head (30) of the bolt (12).

3. An expansion anchor stud according to claim 1, further comprising means for rotationally interlocking the stud (14) and the shield (16).

4. An expansion anchor stud according to claim 3, wherein the means for rotationally interlocking the stud and the shield comprises axially extending prongs 36 on the proximal end of the stud and corresponding prong-receiving notches 38 on the distal end of the shield.

5. An expansion anchor stud according to claim 3, wherein the expansion shield (16) is of the double expansion type having a first expansion member (20) disposed at its distal end, a second expansion-member 22 disposed at its proximal end threaded to receive the proximal end of the bolt, and the first expansion member (20) is unitary with the stud (14).

* * * * *